Figure 1:
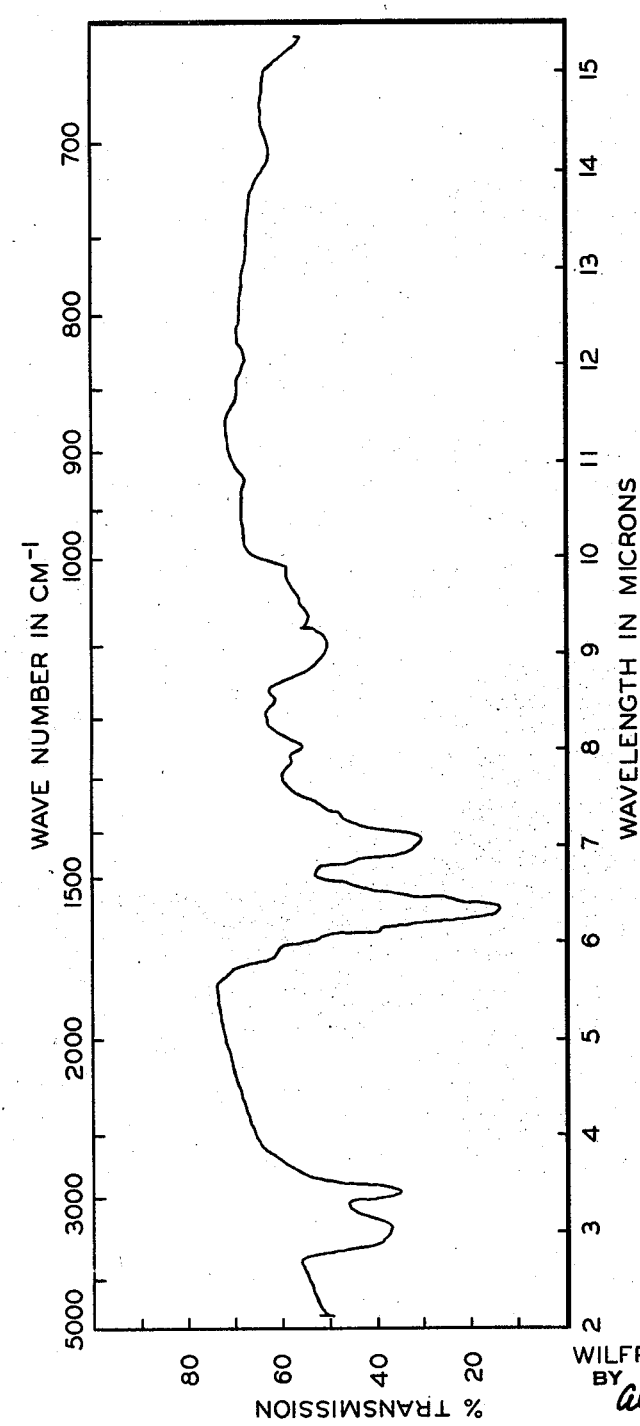

United States Patent Office

2,956,925
Patented Oct. 18, 1960

2,956,925

ANTIFUNGAL ANTIBIOTIC FROM S. COELICOLOR VAR. AMINOPHILUS

Wilfred E. Wooldridge, 100 Professional Bldg., Springfield, Mo.

Filed Jan. 14, 1957, Ser. No. 634,119

4 Claims. (Cl. 167—65)

This invention relates to a new and useful active antifungal, antibiotic substance and relates also to a process for the preparation and purification of said substance.

In recent years the successful efforts to obtain therapeutically useful products from the metabolic growth of various organisms has greatly spurred the search for new and better antibiotic substances produced by fermentation processes. The value of the wide-spectrum antibiotic substances such as penicillin, streptomycin, chlortetracycline, etc. has been established and the search for others has now been greatly extended. One of the objects of this research is the development of antibiotic substances which are more specific in action, or which are useful against organisms for which presently available antibiotic substances are of limited value. For example, although the need for an effective method for the treatment of superficial, i.e. topical, mycoses is an outstanding problem in medical mycology today, few, if any, antibiotic substances are of any general value in these conditions.

It is, therefore, an important object of this invention to provide a new and useful antibiotic substance which acts as an active antifungal agent.

Another object of this invention is the provision of processes for the production of said antifungal, antibiotic substance by fermentation methods.

Yet another object of this invention is the provision of methods for the separation and purification of said antifungal substance in crude concentrates and in relatively pure form as well.

Other objects of this invention will appear from the following detailed description.

The new and useful active antifungal, antibiotic substance of this invention is active in vitro and in vivo and is obtained by culturing the hitherto unknown strain or species of Streptomyces which has been deposited with and is available from the Culture Collection Section, Fermentation Division, Northern Regional Research Laboratory of the United States Department of Agriculture and incorporated into the permanent culture collection of microorganisms as NRRL 2390.

The name S. collicolor var. aminophilus has been chosen for this new organism because it characteristically requires organic nitrogen for growth and does not significantly utilize inorganic nitrogen.

This organism is distinguished from any authentic species listed in the authoritative classification of the Actinomycetes following the key of Bergey's "Manual of Determinative Bacteriology," sixth edition. The outstanding characteristics are:

(1) Failure to utilize either nitrate or ammonia as the sole source of nitrogen.

(2) Production of a soluble brown pigment on asparagine media but not on media containing complex organic nitrogen.

(3) Greenish-yellow vegetative mycelium and white aerial mycelium.

(4) Mercaptan-like odor, particularly on glucose-peptone medium.

Its position in the classification scheme may be designated as follows:

Family—Streptomycetaceae
Genus—Streptomyces
   I. Mesophilic saprophyte
     F. No soluble pigment formed on gelatin or other complex media
       2. Proteolytic action weak
         a. Soluble pigment formed on synthetic agar (glucose or glycerol-asparagine agar)
         bb. Pigment brown to black The cultural characteristics of this species are given below.

The vegetative mycelium is branched and $0.2\mu$ diameter. The aerial mycelium is monopodially branched, $0.4\mu$ diameter, open spirals produced. The conidia are ellipsoidal, measuring $0.3$–$0.4$ by $0.9$–$1.4\mu$.

The optimum temperature for growth is 37° C. in all media with no significant difference, except rate of growth, in the following descriptions between 25°, 30° and 37° C.

The growth on nutrient agar forms a greenish-yellow vegetative mycelium with slightly raised aerial mycelium produced chiefly in the centers of the colonies. The undersurface is lemon yellow and no soluble pigment is formed.

The growth on glucose peptone agar gives a yellow vegetative mycelium with abundant white aerial mycelium. The undersurface is yellow becoming brown in the center. A strong mercaptan-like odor is produced.

Starch is hydrolyzed when grown on starch agar. The growth produces a yellow vegetative mycelium with poorly developed aerial mycelium. A faint yellow-brown soluble pigment is produced.

The growth on Sabourauds agar produces an abundant raised folded growth completely covered with white aerial mycelium. The undersurface is brown and no soluble pigment is formed.

The growth on potato plugs is very rapid, being yellow at first but quickly becoming covered with white aerial mycelium, much raised and folded. A brown discoloration of the potato is noted near the top of the plug only. The potato is much reduced in size, apparently through digestion.

On gelatin, tube cultures liquify in about fifteen days at 30° C. There is flocculent white growth along the stab at 25° C. and settling to the bottom at higher temperatures. No pigment is produced.

On calcium malate agar, a yellow mycelium partially covered with white aerial mycelium is formed. The undersurface is yellow. No soluble pigment is produced.

The growth on nutrient broth yields white colonies on the bottom and on the surface. No soluble pigment is produced.

On both glycerol-nitrate agar and glucose-nitrate agar, there is a very slight spreading growth.

The growth on glycerol-asparagine agar forms a yellowish mycelium. The surface is raised and folded with sporulation at the edges only. A slight greenish color develops on portions not covered by aerial mycelium. The under surface is yellow, becoming brown in old cultures. A soluble pigment is produced which is a slight pink at first but later becoming reddish-brown.

The growth on glucose-asparagine agar is similar to the growth on glycerol-asparagine agar, except that the aerial mycelium is more abundant and the soluble pigment is less intense.

On carrot plugs, the growth develops very slowly but after about twenty days is similar to the growth on potato plugs.

Litmus milk is not coagulated. It is slowly peptonized and is almost clear in thirty days at 30° C. A reddish-brown ring is formed at the surface.

The nitrate reduction is positive but indole is not produced. The organism is unable to utilize $NO_3^-$, $NH_4^+$ or $NO_2^-$ as the sole source of nitrogen.

As a source of carbohydrate, the organism readily utilizes starch, dextrin, glucose, maltose, inulin, ribose, levulose, galactose, glycerol, mannitol and cellobiose. The following are utilized slowly: arabinose, mannose, sucrose, lactose, salicin, sorbitol and sodium succinate. The following are not utilized or utilized only negligibly: inositol, raffinose, rhamnose, lyxose, xylose, dulcitol, sodium citrate and sodium acetate. In testing carbohydrate utilization 0.2% of either glutamic acid or asparagine proved satisfactory as a source of organic nitrogen.

This organism grows readily in an aqueous culture medium containing a source of assimilable nitrogen, a source of carbohydrate, and essential mineral salts. Typical of such a nutrient medium is one made up of 17.5 grams per liter of Bacto Penassay broth, dehydrated. The aqueous broth is prepared by adding the nutrient to the water in the ratio given, and the fermentation broth is sterilized by autoclaving for 45 minutes at 121° C. The growth of the microorganism is aerobic and submerged. Surface growth is also satisfactory. For each 17.5 gram unit of nutrient medium, the latter contains Bacto-beef extract 1.5 g., Bacto-yeast extract 1.5 g., Bacto-peptone 5.0 g., Bacto-dextrose 1.0 g., sodium chloride 3.5 g., dipotassium phosphate 3.68 g., and monopotassium phosphate 1.32 g. The preparations referred to herein are products of Difco Laboratories, Detroit 1, Michigan, and a detailed description of their composition and properties may be found in the "Difco Manual, 9th Edition (1953)," a publication of the manufacturer.

In culturing the organism, the sterile broth is inoculated with a shake culture of the organism grown in an Erlenmeyer flask at room temperature for four days utilizing 100 ml. of the above aqueous nutrient medium or broth as the growth medium for the shake culture. The original inoculated broth is a clear amber color and growth of the culture is noted by the formation of small particles in the flask. The fermentation is aerobic and, after inoculation with the shake culture, is usually carried out for ten days. Temperatures of from 15 to 40° C., preferably about 20° C., are satisfactory and under the constant agitation produced by the introduction of sterile air. The rate of introduction of air is adjusted so that it is the maximum attainable short of causing foaming and may be from 0.5 to 2 volumes of air per volume of broth per minute. Excessive foaming may be overcome by the use of antifoaming agents, such as vegetable oils.

After ten days' growth, the mycelium is harvested by passing the material in the fermentation tanks through a suitable filter to separate the mycelium from the liquid. The active antifungal substance produced is found in the mycelium. It is separated by subjecting the mycelium to washing with water to remove the inert, water-soluble material and then subjecting the remaining material to extraction with a solvent such as methanol. The active antifungal material is separated from the mycelium by this extraction procedure and is slightly basic in reaction.

When extracting the mycelium obtained as the product of the fermentation, several separate extractions are usually carried out to ensure the maximum separation of the active antifungal substance. Rupturing the mycelium cells prior to extraction is advantageous. In the multi-stage extraction utilized, it has been found that about five extraction stages are usually sufficient to separate the major part of the active antifungal substance present. For that amount of mycelium obtained from 20 liters of fermented nutrient medium, about 1.5 to 2 liters of methanol are utilized in each of the separate extraction stages. The extraction is carried out by agitating a mixture of methanol and mycelium for several hours at room temperature, and separating the mycelium from the methanol by filtering through a suitable filter, e.g. a sintered glass filter. The methanol filtrates may be evaporated under partial vacuum and the yellowish, amorphous material remaining is taken up in distilled water. The aqueous mixtures obtained are then lyophilized or freeze-dried. The crude, powdered lyophilized fractions are usually pooled, if evaporated and lyophilized separately, and may then be further purified by a modified chromatographic absorption in order to separate the fractions of maximum activity.

The chromatographic absorption technique which is preferred utilizes a resolving solvent which consists of a mixture of 25 ml. of 3:1 normal propanol:water, 5 ml. redistilled benzene, and 1 ml. of glacial acetic acid. The desired fractionation is obtained by utilizing an absorption column packed with wood pulp cellulose introduced into the column as a slurry in the resolving solvent and then packed tightly in place. Excellent separation is achieved in an apparatus where the absorption column is ⅞ inch in diameter and the slurried cellulose is packed to a height of 5½ inches. Until utilized for the separation step, the cellulose in the column is kept wet with the resolving solvent at all times.

To effect the desired fractionation, the pooled, lyophilized or freeze-dried material is stirred with water, then filtered and the solid material remaining is washed with water until the filtrate does not give a precipitate with silver nitrate. The residue is air-dried, placed on the moist wood pulp cellulose within the absorption column and resolving solvent is slowly passed through the residue resting on the cellulose and allowed to pass through the column. That portion of the resolving slovent passing through the column is collected at 30 minute intervals. This usually amounts to a volume of 3 to 5 ml. The most active fraction obtained so far has an activity of greater than 10,000 u./mg. against a standard of 1,000 u./mg. for the combined material as determined by turbidimetric assay. The assay method utilizes *C. albicans* M63 as the the test organism. A unit is defined as the amount of activity contained in 1 microgram or its equivalent of batch #5 of this material.

The effective culturing of the organism may also be carried out by a process involving a series of transfers of the growing organism to increasingly larger volumes of growth media. For example, when growth is carried out in this manner, the initial stages comprise inoculating a Penassay broth growth medium with the organism and, after growth, transferring a loopful of this cultured broth to a 1% yeast extract, 1% dextrose and 1% agar growth medium for the growth of agar slants. After incubation of the slants for five days at 25° C., a two liter flask containing 750 cc. of Penassay broth is inoculated with an aqueous dilution of the yeast extract-dextrose agar slants and the mixture then incubated for five to seven days at 25° C.

The resulting mixture is employed as the inoculum for inoculating a growth medium comprising an aqueous solution containing 0.15% by weight of Difco yeast extract, 0.15% Difco beef extract, 0.5% Bacto peptone, 0.1% Difco dextrose, 0.35% sodium chloride, 0.368% $K_2HPO_4$ and 0.132% $KH_2PO_4$. This is the standard growth medium employed for the large sacle production of the desired antibiotic material by the culturing of the *S. coelicolor* var. *aminophilus* organism.

At this stage incubation is first carried out at 25° C. in a 50-gallon fermentor containing 160 liters of the medium, the airflow being maintained at 3 cubic feet per minute and the rotation of the impeller or agitator at 150 r.p.m. The incubation is continued under these conditions for 40 minutes.

At the intermediate stage which follows culturing is carried out conveniently in a 200-gallon fermentor at a temperature of 25° C. employing 360 liters of the standard growth medium above and inoculating this medium with 40 liters of the product of the prior 50-gallon stage. Air flow at this 200-gallon stage is controlled at 10 c.f.m. with agitation at 130 r.p.m., the incubation time being 24 hours.

For the final stage, a fermentor of 1500 gallon capacity is suitable, 1100 gallons of the standard aqueous growth medium being added to this fermentor and inoculated with 100 gallons of the prior stage, the culturing being carried out at 25° C. for 144 hours with air flow at 55 c.f.m. and agitation at 120 r.p.m.

To isolate the antibiotic material from the fermentation medium, the whole broth is filtered or centrifuged to separate the mycelium, the latter slurried with water and the slurry passed twice through a colloid mill employing a spacing of about 0.003″. After being centrifuged, the pasty mycelial matter obtained is freeze dried. The dry, solid material is then slurried with methanol and again passed through the colloid mill. The resulting slurry is filtered and the solid material again slurried with methanol and passed through the colloid mill. This process is repeated about four times and until essentially no more color is extracted by the methanol.

The methanol extracts are combined and concentrated under vacuum to a small volume, water is then added and, after all of the methanol is removed, the aqueous slurry is freeze dried. The dried product is extracted twice with methanol at room temperature for two hours, about 100 ml. of methanol being employed for each 2 gm. of solid material extracted. The supernatant liquid is concentrated under vacuum, dried and homogenized, the dried product comprising the desired antibiotic, antifungal substance.

Figure 2:
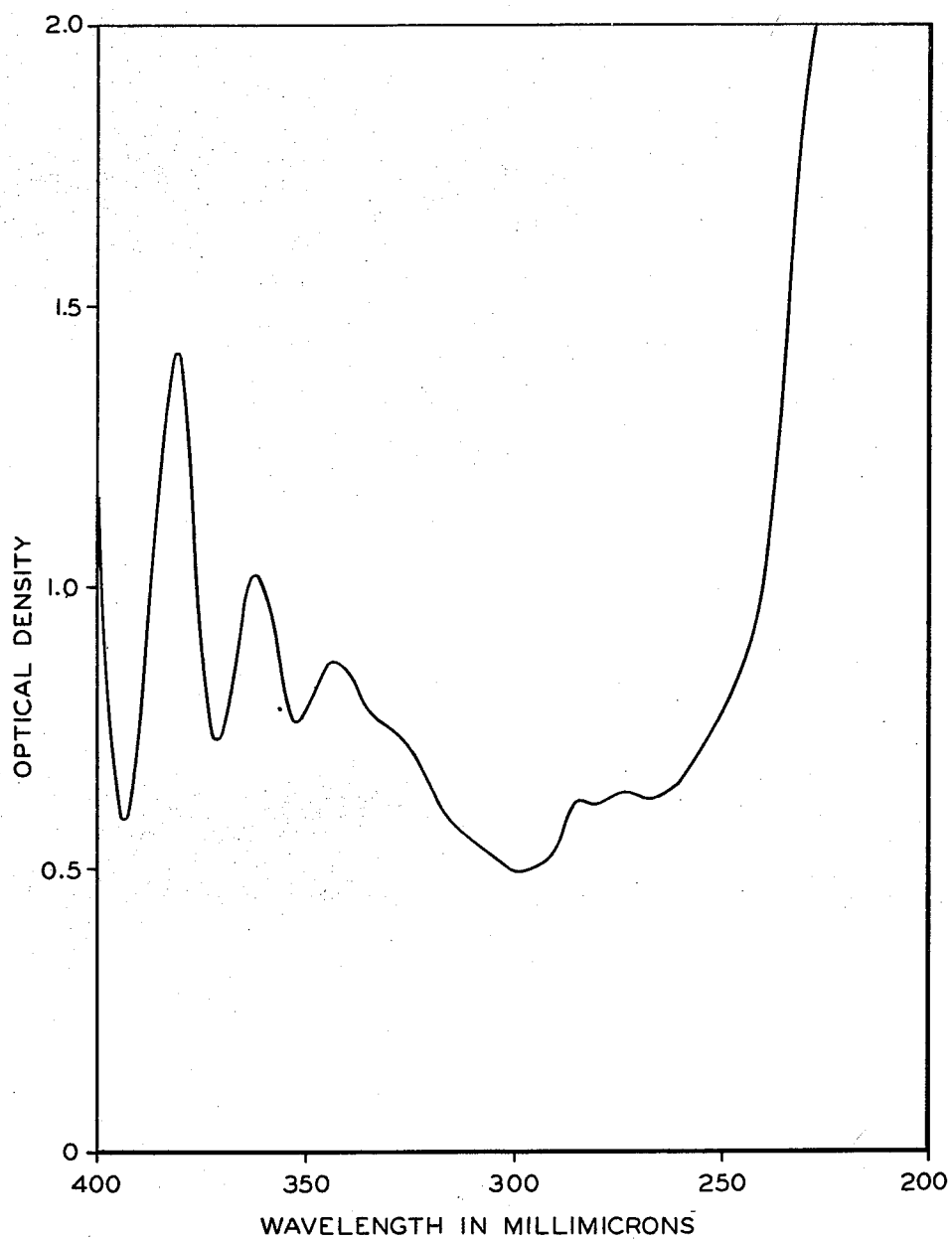

A characteristic infra-red absorption spectrum of the active antifungal, antibiotic evaporated on a salt window is shown in Fig. 1, which forms a part of this specification. This infra-red absorption spectrum shows an OH or NH absorption band at about 3.05 microns, a CH at about 3.4 microns and an amide function at about 6.4 microns. A characteristic ultra-violet absorption spectrum is shown in Fig. 2. Samples of the active antifungal antibiotic substance which have been more highly purified show characteristic maximum and minimum absorption in the ultra-violet region with minimum absorption at about 300 mu, 350 mu, 368 mu, and 390 mu, with maximum absorption at about 340 mu, 358 mu, 378 mu and 400 mu.

The novel antifungal, antibiotic substance obtained by the fermentation process described is active in vivo against systemic *Sporotrichum schenkii* infections on intraperitoneal administration. Dosages of 10 to 20 mg. per kilogram of body weight are satisfactory.

The minimum inhibitory concentration of the antifungal substance in μg./ml. against certain organisms is shown in the following table.

| ATCC No. | Name | Minimal Inhibition Concentration in μg./ml. Days | | | | | | | | |
|---|---|---|---|---|---|---|---|---|---|---|
| | | 1 | 2 | 3 | 4 | 5 | 6 | 7 | 8 | 9 |
| 9197 | Aspergillus fumigatus | N.G. | 31.2 | 31.2 | 125 | 250 | 250 | 500 | 500 | 500 |
| 10124 | Aspergillus flavus | N.G. | 125 | 125 | 250 | 250 | 250 | 250 | 500 | 500 |
| 10522 | Gliocladium vermoeseni | N.G. | N.G. | N.G. | N.G. | 7.8 | 15.6 | 15.6 | 31.2 | 62.5 |
| 10216 | Microsporum audouini | N.G. | 7.8 | 7.8 | 7.8 | 62.5 | 125 | 250 | 250 | 250 |
| 8138 | Microsporum canis | N.G. | 62.5 | 62.5 | 62.5 | 250 | 250 | 250 | 250 | 250 |
| 10215 | Microsporum gypseum | N.G. | 62.5 | 62.5 | 62.5 | 250 | 250 | 500 | 500 | 500 |
| 8506 | Penicillium citrinum | N.G. | 125 | 125 | 125 | 250 | 500 | 500 | 500 | 500 |
| 9533 | Trichophyton mentagrophytes | N.G. | N.G. | 7.8 | 125 | 250 | 250 | 250 | 250 | 250 |
| 9129 | Trichophyton mentagrophytes | N.G. | 31.2 | 31.2 | 31.2 | 250 | 250 | 250 | 250 | 250 |
| 9471 | Alphalosporium spinosum | 250 | 250 | 250 | 250 | 250 | | | | |
| 6676 | Hypomyces rosellus | 1.9 | 3.9 | 7.8 | 7.8 | 7.8 | | | | |
| 9275 | Gilocladium fimbriatum | 125 | 125 | 250 | 250 | 250 | | | | |
| 10195 | Chaetomium cochlioides | 7.8 | 62.5 | 125 | 125 | 125 | | | | |
| 9095 | Myrothecium verrucaria | 125 | 125 | 125 | 250 | 250 | | | | |
| 10226 | Cryptococcus neoformans | 1.9 | 3.9 | 3.9 | 7.8 | 7.8 | | | | |
| 4414 | Cryptococcus neoformans | 3.9 | 3.9 | 31.2 | 125 | 125 | | | | |
| 9366 | Debaryomyces marylandi | 1.9 | 62.5 | 125 | 250 | 250 | | | | |
| 9947 | Endomycopsis fibuliger | 0.9 | 3.9 | 7.8 | 7.8 | 7.8 | | | | |
| 7601 | Fusarium oxysporum | 3.9 | 62.5 | 250 | 250 | 250 | | | | |
| 7808 | Fusarium vasinfectum | 250 | 250 | 250 | 250 | | | | | |
| 8567 | Saccharomyces fragilis | 31.2 | 250 | 250 | 250 | | | | | |
| 10632 | Kloeckera africana | 15.6 | 125 | 125 | 125 | | | | | |
| 8170 | Hansenula anomala | 0.9 | 15.6 | 125 | 250 | | | | | |
| 10212 | Sporotrichum schenkii | 3.9 | 125 | 250 | 250 | | | | | |
| | M63 Candida albicans | 3.9 | 7.8 | 31.2 | 31.2 | | | | | |
| | Sporotrichum schenkii | 250 | 250 | 250 | 250 | 500 | 500 | 500 | | |
| | Ashbya gossypii | 0.9 | 0.9 | 0.9 | 0.9 | 1.9 | 3.9 | 3.9 | | |
| | Trichosporum giganteum | 125 | 125 | 125 | 250 | 500 | 500 | 500 | | |
| | Trichosporum cutaneum | 7.8 | 125 | 125 | 250 | 500 | 500 | 500 | | |
| | Penicillium gladioli | 62.5 | 125 | 125 | 125 | 250 | 250 | 250 | | |
| | Aspergillus clavatus | 15.6 | 62.5 | 125 | 250 | 250 | 250 | 250 | | |
| | Aspergillus clavatus | 0.9 | 62.5 | 125 | 250 | 250 | 250 | 500 | | |
| | Aspergillus niger | 62.5 | 125 | 250 | 250 | 250 | 500 | 500 | | |
| | Aspergillus parasiticus | 15.6 | 125 | 250 | 500 | 500 | 500 | 500 | | |
| | Streptomyces vinezuelae | 250 | 250 | 250 | 250 | 500 | 500 | 500 | | |
| | Streptomyces lavendulae | 62.5 | 62.5 | 125 | 125 | 125 | 125 | 125 | | |
| | Streptomyces antibioticus | 62.5 | 62.5 | 125 | 125 | 125 | 125 | 125 | | |
| | Candida macedoniensis | 250 | 250 | 500 | 500 | 500 | 500 | 500 | | |
| | Candida stellatoidea | 0.9 | 3.9 | 7.8 | 15.6 | 62.5 | 250 | 250 | | |
| | Candida macedoniensis | 31.2 | 250 | 250 | 500 | 500 | 500 | 500 | | |
| | Alternaria porri | 1.9 | 7.8 | 7.8 | 15.6 | 31.2 | 31.2 | 250 | | |
| | Alternaria radicina | 1.9 | 3.9 | 15.6 | 31.2 | 31.2 | 62.5 | 62.5 | | |
| | Epidemophyton floccosium | 1.9 | 3.9 | 3.9 | 3.9 | 3.9 | 3.9 | 3.9 | | |
| | Mucor parasiticus | 62.5 | 62.5 | 125 | 250 | 250 | 250 | 250 | | |
| | M61 Candida stellatoidea | 1.95 | 3.9 | 3.9 | 7.81 | | | | | |
| | M62 Candida krusei | 1.95 | 62.5 | 250 | 250 | | | | | |
| | M63 Candida albicans | 3.9 | 7.81 | 7.81 | 15.62 | | | | | |
| | M30 Streptomyces griseus | 0.03 | 62.5 | 250 | 250 | | | | | |
| | M20 Penicillium chrysoginum | 0.97 | 1.95 | 125 | 250 | | | | | |
| | M160 Sporotrichum schenkii | 0.48 | 125 | 250 | 250 | | | | | |
| | M200 Hormodendrum pedrosoi | 125 | 250 | 250 | 250 | | | | | |
| | M240 Sporobolomyces salmonicolor | 3.9 | 125 | 250 | 250 | | | | | |
| | M260 Cryptococcus neoformans | 0.48 | 0.97 | 0.97 | 1.95 | | | | | |
| | M270 Allescheria boydii | 250 | 250 | 250 | 250 | | | | | |
| | M50 Saccharomyces cerevisiae | 1.95 | 250 | 250 | 250 | | | | | |

(N.G.=No growth in control.)

Identity tests giving clues to the chemical structure of the antifungal antibiotic are as follows:

| Identity Test | Result |
| --- | --- |
| Ninhydrin | Positive. |
| Vanillin and HCl | Do. |
| Molisch | Negative. |
| Guanibo (oxidized nitroprusside) | Do. |
| Aromatic nitro or amino groups | Do. |

This application is a continuation-in-part of my copending application Ser. No. 473,216, filed December 6, 1954, now abandoned.

It is understood that the foregoing detailed description is given merely by way of illustration and that many variations may be made therein without departing from the spirit of my invention.

Having described my invention, what I desire to secure by Letters Patent is:

1. Antifungal substances comprising the alcohol-soluble material extracted from the mycelium formed on fermentation of a culture of the streptomyces NRRL 2390 in a nutrient medium, said material being water-insoluble and exhibiting the infra-red absorption spectrum when evaporated on a salt window substantially as shown in Fig. 1 having an absorption band at about 3.05 microns indicating an OH or NH function, an absorption band at about 3.4 microns indicating a CH group, and an amide function at about 6.4 microns.

2. Process for the production of antifungal substances, which comprises growing under aerobic conditions a culture of the streptomyces NRRL 2390 at a temperature of 15 to 40° C. in an aqueous nutrient medium containing sources of assimilable nitrogen and carbon, harvesting the mycelium, washing the mycelium with water, extracting the washed mycelium with methanol, evaporating the methanol extract, taking up the residue with water, and lyophilizing the aqueous mixture to leave a yellow amorphous residue of antifungal substances.

3. Process for the production of antifungal substances, which comprises growing under aerobic conditions a culture of the streptomyces NRRL 2390 at a temperature of 15 to 40° C. in an aqueous nutrient medium containing sources of assimilable nitrogen and carbon, and essential mineral salts, harvesting the mycelium, washing the mycelium with water, extracting the washed mycelium with methanol, evaporating the methanol extract, taking up the residue with water, and lyophilizing the aqueous mixture to leave a yellow amorphous residue of antifungal substance.

4. Process for the production of antifungal substances, which comprises growing under aerobic conditions a culture of the streptomyces NRRL 2390 at a temperature of 15 to 40° C. in an aqueous nutrient medium containing beef extract, yeast extract, peptone, dextrose, sodium chloride, dipotassium phosphate and monopotassium phosphate, harvesting the mycelium, washing the mycelium with water, extracting the washed mycelium with methanol, evaporating the methanol extract, taking up the residue with water, and lyophilizing the aqueous mixture to leave a yellow amorphous residue of antifungal substance.

References Cited in the file of this patent
UNITED STATES PATENTS
2,649,401    Haines _____ Aug. 18, 1953

OTHER REFERENCES

Alexopoulos: Ohio J. Science, vol. 41, 1941, pp. 425–430.

Schatz et al.: Mycologia, vol. 40, No. 4, pp. 461–477.

Waksman et al.: "Actinomycetes and Their Antibiotics," pub. 1953 by Williams and Wilkins Co., pp. 87, 172, 174, 176–178.

Dutcher et al.: Article in "Antibiotics Annual," 1953–54," pub. by Med. Encyclopedia Inc., 1953, pp. 191–194.

Lechvalier et al.: Mycologia, March–April 1953, vol. 45, No. 2, pp. 155–171.

Biological Abstracts, August 1954, pp. 1837 and 1851 (paragraphs 18697 and 18839).

Waksman: Journal of Bact., 1946, pp. 755 and 756.

Oswald et al.: Antibiotics Annual, 1955–56, pp. 236–239.

Pledger et al.: Antibiotics Annual, 1955–56, pp. 249–254.

Taber: Antibiotics and Chemotherapy, April 1954, pp. 455–461.

Utahara: J. Antibiotics, vol. 7, No. 4, pub. 1954, pp. 120–124.

Oroshnik: Science, Feb. 4, 1955, pp. 147–148.

Skinner: Nature, p. 1191, Dec. 26, 1953.

UNITED STATES PATENT OFFICE
CERTIFICATE OF CORRECTION

Patent No. 2,956,925                          October 18, 1960

Wilfred E. Wooldridge

It is hereby certified that error appears in the printed specification of the above numbered patent requiring correction and that the said Letters Patent should read as corrected below.

Column 1, line 56, for "collicolor" read -- coelicolor --; column 4, line 36, for "slovent" read -- solvent --; line 66, for "sacle" read -- scale --; column 7, line 40, for "substances" read -- substance --.

Signed and sealed this 25th day of April 1961.

(SEAL)
Attest:

ERNEST W. SWIDER                                 DAVID L. LADD
Attesting Officer                                    Commissioner of Patents